March 30, 1965  J. D. BROWDER  3,176,239
IMPULSE-NOISE ARRESTING TUNED AMPLIFIER
Filed Sept. 22, 1959  2 Sheets-Sheet 1

INVENTOR.
Jewel D. Browder

March 30, 1965     J. D. BROWDER     3,176,239
IMPULSE-NOISE ARRESTING TUNED AMPLIFIER
Filed Sept. 22, 1959     2 Sheets-Sheet 2
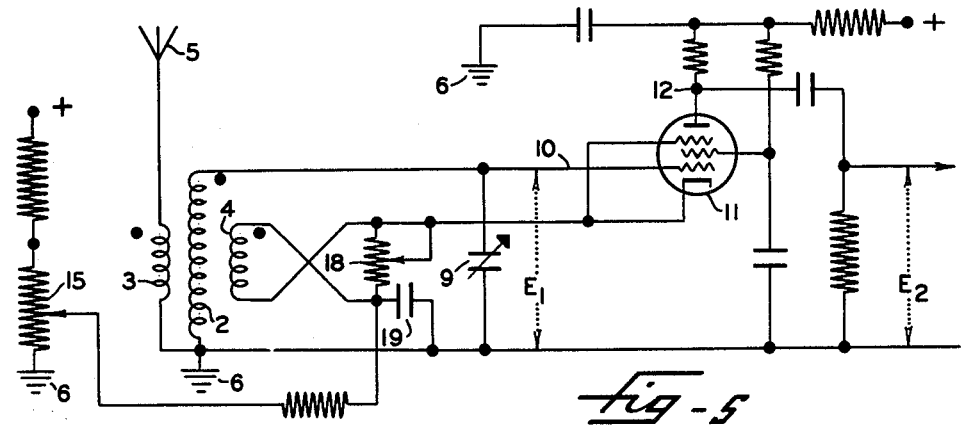
*fig-5*
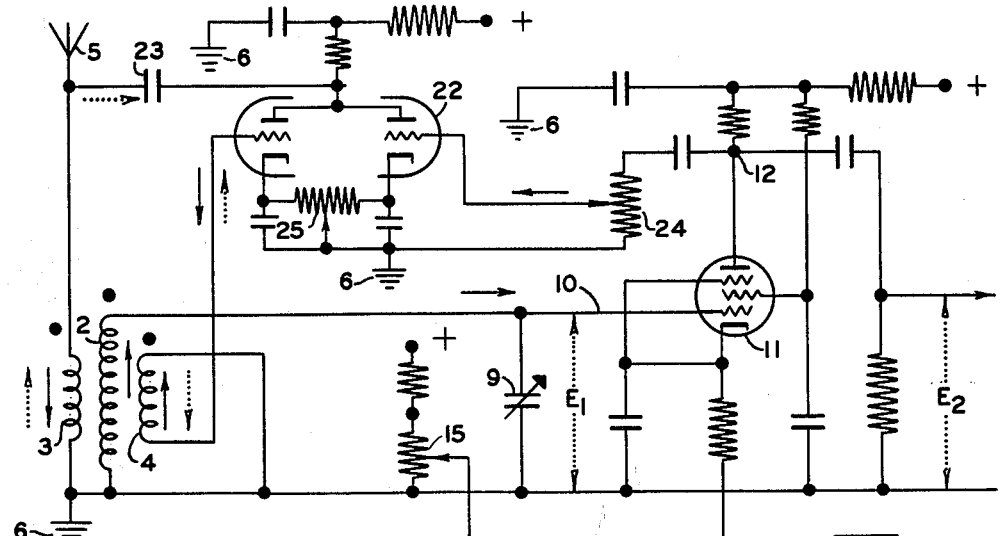
*fig-7*
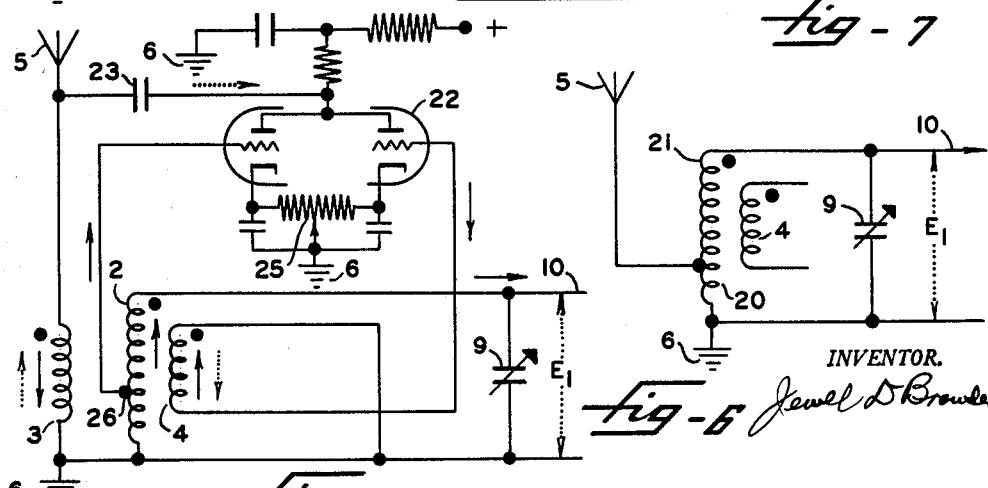
*fig-8*     *fig-6*
INVENTOR.
Jewel D. Browder

United States Patent Office 3,176,239
Patented Mar. 30, 1965

3,176,239
IMPULSE-NOISE ARRESTING TUNED AMPLIFIER
Jewel D. Browder, San Diego, Calif., assignor of fifty percent to James W. Browder, San Diego, Calif.
Filed Sept. 22, 1959, Ser. No. 841,543
7 Claims. (Cl. 330—149)

The present invention relates generally to low-level radio-frequency tuners and amplifiers as used in receivers of radio, radar and sonar signals. More particularly, this invention relates to circuitry which comprises the front-end of such receivers, wherein desired signals are selected and received from a receiving antenna or transducer. Emphasis are placed on the receiver's front-end, since it is in this section that the present invention is especially applicable not only for selecting and amplifying desired signals but also for arresting electrical transients or impulses such as atmospheric or static discharges that may be received randomly or otherwise on the same frequency that signals are received, and which may produce such violent noise-disturbances in the receiver's output as to seriously limit the usefulness of radio, radar and sonar systems.

The present invention is predicated on the concept that impulse noise, which is defined as the noise caused by an electrical transient or impulse entering the tuned circuit, consists of two parts occurring in rapid succession. The first part is the transient or impulse itself which, being of a square waveform and having a relatively short time-duration, usually produces a short sound resembling a click or snap. But this part is not recognized in the total noise-disturbance because it is followed so quickly by the second part which results from the well known phenomena of "ringing," which is defined as the damped-wavetrain of sinusoidal voltages of free oscillations following the shock-excitation given to the tuned circuit by the entering transient or impulse. The second part is characterized by a relatively long time-duration which may extend for more than two thousand times the duration of the first part, depending on the Q-factor of the tuned circuit and characteristics of the transient or impulse. The resulting sound is thus described as a scratching or grinding noise rather than a sudden snap or click.

Further, the present invention is hereinafter described with reference to three specific operating conditions to which the antenna-coupled amplifier of a receiver is subjected during practical usage, namely, the entrance of an externally-generated transient or impulse, the operating state of free oscillations, and the operating state of forced oscillations. But the construction and operation of the present invention are based on the old, familiar concept of simply neutralizing a transient or impulse by confronting it with another having equal and opposite characteristics.

Indeed, the principle of neutralization has long been regarded as offering the ideal theoretical solution to the impulse-noise problem, particularly the elimination of atmospheric or static disturbances. Workers in the art, however, apparently encountered so many difficulties in attempting to reduce the principle to practice that they have produced a variety of other solutions or techniques instead, generally known by the names of limiter, clipper, silencer, squelcher, muter, etc. A recent and currently popular technique is the "blanker" which is essentially an electronic switch actuated by an incoming transient or impulse so as to disconnect either the entire receiver or its output from the antenna, and of course re-connect after the transient or impulse has ended. The present invention is therefore believed to constitute the first practical solution to the impulse-noise problem based on the principle of neutralization. Thus the term "neutralizer" has been suggested as an appropriate name for the technique of the present invention.

In spite of the difficulties involved in applying the principles of neutralization, the present invention is especially successful when used with very low radio-frequency signals such as telegraph code and pulsed sonar receptions, this being achieved by employing a particular type of transformer structure and associated circuitry as subsequently more fully described.

The object of the present invention is to provide an alternating-current tuned amplifier so arranged and constructed that in addition to accomplishing the usual functions of selecting and amplifying received signals it also arrests impulse noise within itself, thus preventing further passage of said noise toward the receiver output.

This object is achieved by two separate species of the present invention, each identified and designated on the basis of operating characteristics. The first specie possesses positive feedback energy, causing an increased sensitivity and a decreased frequency-bandwidth. The second specie does not possess feedback energy, its sensitivity and bandwidth being governed by the circuit-Q as in conventional tuned amplifiers.

The means and methods of providing the above species in accordance with the present invention are illustrated in the accompanying drawings in which like numbers designate like parts.

FIGURES 3, 4 and 5 depict schematic circuits of alternate embodiments of the specie possessing positive feedback energy.

FIGURE 6 is a schematic circuit diagram of an oscillatory circuit comprising an auto-transformer equipped with a tertiary winding.

FIGURE 7 is a schematic circuit diagram of one embodiment of the specie which does not possess positive feedback energy.

FIGURE 8 illustrates in part the preferred embodiment of the specie which does not possess positive feedback energy.

Figure 1:
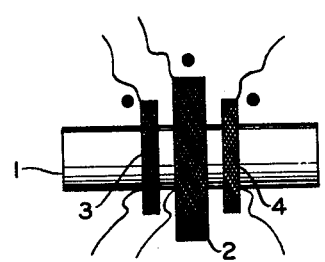
FIGURE 1 illustrates the construction of the 3-winding radio-frequency transformer employed in the present invention, showing particularly that the secondary winding is located between the primary and tertiary windings.

A most significant feature of the present invention involves the physical construction of the 3-winding radio-frequency transformer which is used in the coupled resonant circuit of the invention. FIGURE 1 illustrates the particular form of construction, that is, the physical form and arrangement of windings on a conventional supporting rod or tubular member 1 which may or may not enclose a slug or core of powdered-iron or other material for enhancing the magnetic circuit. The essential point of construction is the fact that the windings are multilayer and the secondary winding 2 is located in a position lying between the other windings, one being the primary and the other the tertiary. To accentuate this point I have represented pie-wound coils in FIGURE 1, with the secondary being larger than the others. However, the same relative locations of windings apply even when only single-layer coils are employed, mounted end-to-end, as often used with high radio-frequencies, but this single layer coil form and these frequencies, of course, are ineffective to accomplish the objects and purposes of the present invention.

Further, in order to clarify subsequent disclosures, it should be noted that (a) all three windings of said transformer are wound in the same direction according to usual practice, (b) each coil has a "starting-end" adjacent to said supporting member and an "ending-end" leaving the coil's periphery, and (c) a conventional polarity mark (large dot) is assigned to the ending-end of each coil. It is immaterial which of the smaller coils serves as the primary winding and which serves as the tertiary winding, but for the sake of harmonizing with subsequent circuit diagrams the left-side coil 3 is designated the primary and the right-side coil 4 the tertiary.

Figure 2:
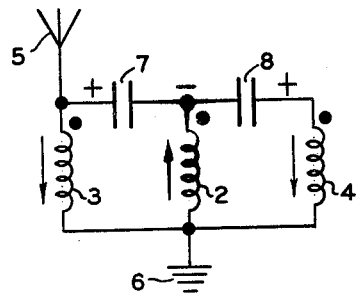
FIGURE 2 is a schematic diagram of an equivalent circuit of said 3-winding transformer as seen by an externally-generated electrical transient or impulse impressed on the receiving antenna.

Now the same transformer is again represented in FIGURE 2 as the equivalent circuit seen by an externally-generated transient or impulse when impressed across antenna 5 and ground 6. Because of the square waveform and high time-rate of change which characterize said transient or impulse, the three windings appear as high-impedance choke coils and the inherent capacitances between windings appear as fixed capacitors. Thus, if said transient or impulse has a positive sign and is directed downward from the antenna according to the arrow drawn alongside primary winding 3, a capacitor 7 intervenes between said primary winding and the secondary winding 2 having a positive charge on the primary side and a negative charge on the secondary side, as indicated. Clearly the latter charge is negative with respect to the former positive charge, and positive with respect to ground. Simultaneously, a capacitor 8 intervenes between said secondary winding and the tertiary winding 4 having a negative charge on the secondary side and a positive charge on the side of the tertiary winding. Each of said windings has a distributed capacitance, as is well known, which is in parallel with the coil turns and terminates on the coil terminals, that is, said starting-end and ending-end. While the distributed capacitances of the three windings are not illustrated in FIGURE 2, their presence is to be understood, together with the normal functions of the distributed capacitances of a coil. Among the latter is the absorption and storage of energy from a transient or impulse prior to the passage of current through the coil turns, examples of which are subsequently shown.

It is well known that said inherent capacitances 7 and 8, FIGURE 2, hereinafter referred to as parasitic capacitances, play a minor role in the transfer of signal (sinusoidal) energy from winding to winding because this energy transfer is accomplished almost entirely by the phenomenon of electromagnetic induction, as evidenced by the fact that said transfer is virtually unchanged when a Faraday shield is placed between the windings. But it is not so well known that said capacitances 7 and 8 are especially significant in the transfer of steep-wave impulse energy from winding to winding because this energy transfer is accomplished by the phenomenon of electrostatic induction. Use of this phenomenon, as subsequently described, is one of the basic features of the present invention.

Figure 3:
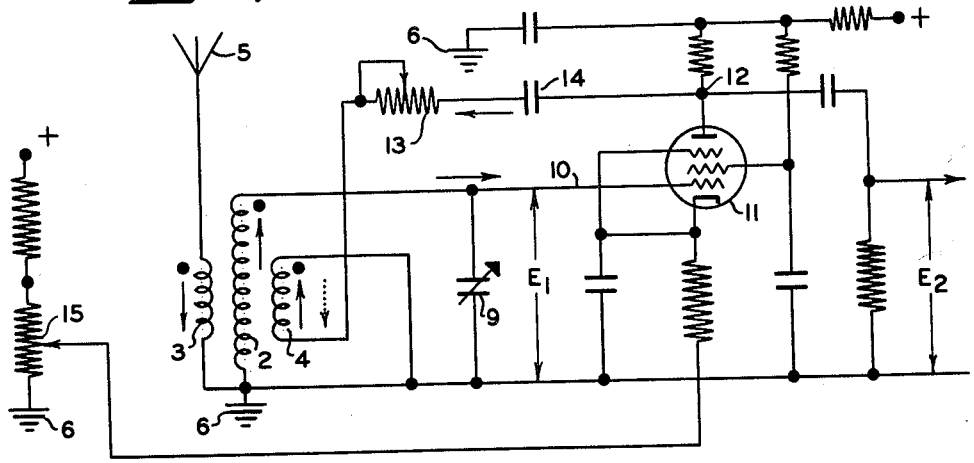

Having described said transformer with reference to its structure and its parasitic capacitances, we shall next consider its functions in the coupled resonant circuit of the present invention. FIGURE 3 illustrates essential components of one embodiment of the invention having positive feedback energy, excepting the power supply which is understood to have its negative terminal grounded and its positive terminal joined to all terminals marked with a plus sign. Primary winding 3 is joined to a source of alternating-current signals represented by the receiving antenna 5 and ground 6. Secondary winding 2 is joined in series with tuning capacitor 9, and further connected by means of conductor 10 to the control grid of pentode 11. Tertiary winding 4 is joined across ground 6 and the output of said pentode at junction 12, including series-connected rheostat 13 and coupling capacitor 14. All appurtenances of said pentode are considered to be clear to persons versed in the art, thus requiring no description.

Now when the secondary circuit is tuned to the frequency of the signal current in the primary winding, the oscillatory circuit comprising the secondary winding and tuning capacitor operates in the state of forced oscillations, the state being so designated because the oscillations are forced or driven by incoming signal-energy which synchronously supplies the circuit losses. A sinusoidal voltage $E_1$ exists across conductor 10 and ground 6, and since it is applied to the control grid of the pentode it appears in amplified form as the output signal voltage $E_2$. During this state of forced oscillations signal energy in the primary winding is transferred to both the secondary and tertiary windings by virtue of mutual inductances (the phenomena of electromagnetic induction), with the transferred energy not only supplying the oscillatory-circuit losses but also inducing a voltage in the tertiary winding. These actions with their relative instantaneous directions are indicated by solid arrows drawn alongside the separate windings. Note especially that the voltages across the secondary and tertiary windings are in phase with each other.

Accompanying these actions is obviously a feedback voltage and current acting between junction 12 and ground 6, through capacitor 14, rheostat 13, and the tertiary winding. Allowing for phase-inversion of the pentode, it is seen that this feedback energy, or at least appreciable components of the voltage and current are in phase with the voltage induced in the tertiary winding, resulting in regenerative or positive feedback action which must be controlled in order to avoid the operating state of self-oscillations. Manual control of regeneration as well as amplifier gain is therefore vested in potentiometer 15 which sets the cathode-bias voltage by use of said power supply not shown. Other forms of control may be used, such as plate-voltage control, and screen-grid voltage control.

An analysis shows that the most significant features of the neutralization process, that is, how a transient is generated within the circuitry to neutralize a transient entering the circuitry from an external source, are the relative instantaneous directions of the entering impulse, the resultant voltages, and the feedback energy from the pentode. To illustrate these features, assume that an entering impulse having a positive sign is conveyed from the antenna to the ending-end terminal of the primary coil 3, FIGURE 3, so that it acts downward in said coil as indicated by the arrow drawn alongside in accordance with the old concept of current flow from the positive terminal of a source. By continuing the use of this concept, it will be seen that the ending-end terminals of both secondary and tertiary coils also have positive signs with respect to ground by virtue of the parasitic capacitances therebetween as previously described and designated 7 and 8 in FIGURE 2. Clearly there is a drop of impulse voltage across these parasitic capacitances, so that the positive impulse voltage on the secondary-coil terminal has less amplitude than that on the antenna-coil terminal. Likewise the amplitude of the positive impulse voltage on the tertiary coil terminal is less than that on the secondary-coil terminal, but since this latter terminal is grounded, FIGURE 3 (as opposed to that of FIGURE 2) the positive impulse voltage appearing thereon is conveyed to ground.

The positive impulse voltage on the secondary coil terminal is conveyed to the input grid of the pentode and thus a responsive impulse is generated therein and transmitted to the tertiary coil. This locally-generated impulse has a minus sign with respect to the positive impulse on the secondary ending-end terminal owing to phase reversal in the pentode. It also has sufficient energy to deliver to the ending-end terminal of the secondary coil a negative voltage which substantially equals the positive voltage thereon due to the entering impulse, this delivery being made by way of the parasitic capacitance between the tertiary and secondary coil terminals (8, FIGURE 2)

as well as the distributed capacitance (not shown) of the tertiary coil which exists across its terminals in shunt with the coil turns.

The amplitude of the locally-generated impulse is adjusted by rheostat 13 after gain control 15 has been set to yield a high degree of amplification, with an accompanying regenerative action (positive feedback) which is just short of that required to sustain self-oscillations. The locally-generated impulse therefore increases the negative voltage of the entering impulse already existing on the ending-end terminal of the tertiary coil by an amount sufficient to neutralize the positive voltage of the entering-impulse already existing on the ending-end terminal of the secondary coil and to establish thereon a negative voltage. This negative voltage is then opposed by the positive voltage on the ending-end terminal of the primary coil due to the entering impulse, and it is seen that this same negative voltage is now applied to the input grid of the pentode. But owing to the drop across the parasitic capacitance between secondary and tertiary coil terminals (8, FIGURE 2), said voltage becomes a positive voltage with respect to ground and so there still remains an impulse-voltage input to the amplifier which equals the drop across said capacitance. While this drop prevents complete neutralization of both entering and locally-generated impulses, the partial neutralization obtained is of practical significance since laboratory tests have shown impulse attenuations amounting to 30 db and more.

Incidentally, it is apparent in the above analysis that the relative polarities with respect to ground of the entering impulse as transmitted by said parasitic capacitances from the primary coil to the secondary coil and onward to the tertiary coil are identical to those of a sinusoidal signal as indicated by said relative instantaneous polarity marks, FIGURE 3. That is, when either a positive impulse or a positive sinusoidal signal enters the ending-end terminal of the primary coil, corresponding terminals of both secondary and tertiary coils also have positive polarities. This follows from the fact that all three coils are wound in the same direction as previously described. However, if either coil, for example, the secondary coil, is wound in a direction opposite to that of the other coils, then the said parasitic capacitances would remain unchanged and therefore the relative polarities of an entering impulse would remain as aforedescribed, but the opposite winding sense or direction of the secondary coil would change the instantaneous relative polarity of sinusoidal signals.

Similarly, a reversal of the terminal connections of any of the transformer windings changes the instantaneous relative polarities. In the case of the tertiary winding 4, a reversal of its terminal connections determines whether the circuit of FIGURE 3 is to be regenerative, as shown, or degenerative which would be the case if connected as shown in FIGURE 2. In either case the parasitic capacitances and the relative impulse polarities on the ending-end terminals remain the same as before described.

With further reference to the parasitic capacitances 7 and 8, FIGURE 2, it will be clear that (1) their absolute capacitance values are extremely significant, and (2) said values are determined by the transformer structure. These values limit the usefulness of the invention to relatively low radio frequencies, because transformer coils decrease in physical size and number of wire turns as the frequency is increased. Very good results are obtained in the VLF band (10–30 kcs.), but in the broadcast band (540–1600 kcs.), for example, parasitic capacitances becomes so small owing to the reduced coil dimensions required for these frequencies that the invention has no particular merits.

Figure 4:
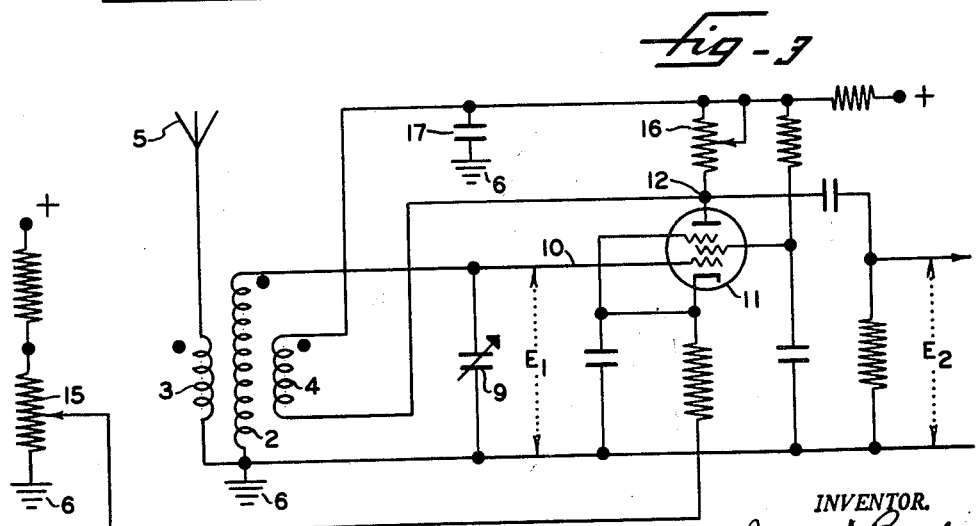

FIGURE 4 represents another embodiment of the specie which possesses positive feedback energy. An examination of the circuit diagram shows that it differs from the previous embodiment, FIGURE 3, only in the manner of connecting the tertiary winding. Here said winding is shunted with rheostat 16, and the parallel combination constitutes the plate-load of the pentode. Note that the ending end of the tertiary winding as identified by the polarity mark (large dot) is grounded for alternating currents through bypass capacitor 17. It should be clear that the embodiment, FIGURE 4, functions basically in the same manner as the previous embodiment, FIGURE 3, particularly with reference to tuning, gain control, and neutralization of entering transients or impulses. Rheostat 16 corresponds to rheostat 13 of FIGURE 3, in that it serves as an aid for coordinating the secondary and feedback circuits for achieving a gradually-increasing control of regeneration.

FIGURE 5 illustrates still another embodiment of the specie possessing positive feedback energy. In it the parallel combination of the tertiary winding and rheostat 18 is placed in the cathode circuit of the pentode, and the tertiary winding is grounded for alternating currents through capacitor 19. Rheostat 18 serves to effect the desired control of regeneration previously described. Laboratory tests showed that the tertiary winding must contain more turns of wire to effect the desired control of regeneration than are needed in embodiments shown in FIGURES 3 and 4, even though all other pertinent factors remained unchanged.

With reference to overall performance, tests showed that all three embodiments, FIGURES 3, 4 and 5, are virtually equal. It was also found that two stages may be joined in cascade, as in the case of conventional tuned amplifiers, provided that the coupling between stages is made extremely weak in order to avoid interstage oscillations. A buffer amplifier may suffice for the coupling means. But the most outstanding feature of the 2-stage cascade amplifier is its added capability for arresting impulse noise. For when static disturbances are very intense and occurring relatively close together in time, a single-stage amplifier of either embodiment, FIGURES 3, 4 or 5, does not arrest all of the impulse noise. Some transients or impulses therefore pass through the first stage at random intervals and are impressed on the second stage, in which they are stopped or greatly reduced in amplitude. Even with said weak coupling between stages, the reduced overall gain is far outweighed by the increased noise-arresting capability.

Each of the three embodiments, FIGURES 3, 4 and 5, performs equally as well when an auto-transformer winding mutually coupled with a tertiary winding, is substituted for the 3-winding transformer above described. Instead of presenting all three complete circuit-diagrams as in FIGURES 3, 4 and 5, only said auto-transformer and the oscillatory circuit are shown in FIGURE 6, it being understood that remaining portions not shown and required to complete each of the three embodiments are the same as shown in said figures. The signal input-circuit includes antenna 5, primary section 20, and ground 6; while the oscillatory circuit is composed of the series connection of said primary section, secondary section 21, and tuning capacitor 9. Tertiary winding 4 may be employed in each of the three different methods which characterize the three embodiments above described.

Operation of the auto-transformer, relative to impulse neutralization, will be clear to persons skilled in the art, particularly when it is seen that the distributed capacitance of section 21 (not shown) acts as a substitute for parasitic capacitance 7, FIGURE 2, to convey an entering impulse to the ending-end terminal as designated with said polarity mark, FIGURE 6. Also between this terminal and the corresponding terminal of the tertiary coil 4 is a parasitic capacitance (not shown) which is comparable with 8, FIGURE 2. Thus said distributed and parasitic capacitances function in the same manner as parasitic capacitances 7 and 8, FIGURE 2, in the impulse-neutralization process as above described.

The second specie of the present invention comprises two embodiments, the first of which is illustrated in FIGURE 7. Here the same 3-winding transformer as utilized in embodiments of the first specie, FIGURES 3, 4 and 5, is again employed in the coupled resonant circuit. Pentode 11 and the oscillatory circuit also correspond with those of previous embodiments, but a twin-triode 22 is so employed that its output is joined to the antenna input-circuit through capacitor 23. Inputs to said twin-triode comprise the tertiary-winding voltage and the output voltage of the pentode applied through potentiometer 24. From the arrows representing relative instantaneous directions, it is seen that said input voltages have opposite signs, and therefore if their amplitudes are equal their vector sum is zero, which means there is little or no output signal of said twin-triode during signal reception or the state of forced oscillations. Said twin-triode thus constitutes a summing amplifier whose gains are equalized by adjusting potentiometer 25, while the function of potentiometer 24 is to reduce the amplitude of the amplified signal to substantially that of the oppositely-phased signal appearing across the tertiary winding in order to achieve virtually zero signal output of said summing amplifier.

But these substantially equal amplitude inputs and virtually zero output conditions of normal signal reception do not apply to an impulse. For when an impulse enters the primary winding and is transmitted to the secondary ending-end terminal and thence to the tertiary ending-end terminal by way of aforesaid parasitic capacitances, the impulse inputs to the summing amplifier, although having opposite phases, do not have substantially equal amplitudes. Instead, by reference to aforesaid analysis relating to FIGURE 3, it can be understood that the amplitude of the impulse coming from the tertiary winding is somewhat less than the amplitude of the amplified impulse coming from the pentode output. The impulse which comes from the tertiary winding is virtually zero owing to its ending-end terminal being grounded. The impulse which comes from the pentode output is a part of the amplified impulse voltage drop across the parasitic capacitance between the ending-end terminals of the secondary and tertiary coils, that of the latter coil being grounded.

Now with the two impulse inputs of the summing amplifier 22, FIGURE 7, having unequal amplitudes, their vector sum is amplified and thus an output voltage and current are applied to the antenna input circuit through said capacitor 23. This output of the summing amplifier constitutes a locally-generated impulse and its direction with respect to the antenna and ground terminals of primary winding 3 is opposite to that of the entering impulse, the opposite directions being indicated by the dotted arrow representing the locally-generated impulse and the solid arrow representing the entering impulse. The two impulses coincide in the distributed capacitance (not shown) of the primary winding, thus reducing the amplitude of impulse voltage on the ending-end terminal of this winding. This reduced voltage is then transferred to the ending-end terminal of the secondary winding by way of the intervening parasitic capacitance, so that the impulse voltage applied to the input grid of the pentode has much less amplitude than it would have if the locally-generated impulse were absent. Therefore the amplitude and resulting noise of the output impulse voltage $E_2$, FIGURE 7, are substantially reduced by the presence of said locally-generated impulse.

The second and preferred embodiment of the second species of the present invention is partly illustrated in FIGURE 8. Here the two inputs applied to the control grids of twin-triode 22 are the secondary and tertiary voltages as indicated. Only a portion of the secondary signal voltage is used which closely approximates the amplitude of the tertiary signal voltage, since any small inequalities in the amplitudes of the two voltages as well as inequalities in the gains of the two triodes are compensated for by the setting of potentiometer 25. This necessitates a tap 26 on the secondary winding. Again said twin triode serves as a summing amplifier, so that during signal reception its output is virtually zero because the inputs have substantially equal amplitudes and opposite phases.

But as in the former embodiment, FIGURE 7, the inputs have unequal amplitude when an impulse enters the antenna and ground terminals. The result is a locally-generated impulse which passes through coupling capacitor 23, and is applied across the primary winding in the opposite sense or direction to that of the entering impulse as again indicated by a dotted arrow for the locally-generated impulse and a solid arrow for the entering impulse. And the coincidence of the two impulses across the primary winding produces the unequal amplitudes of said impulse input voltages in essentially the same manner as that above described with reference to FIGURE 7.

This completes the description of the second specie of the entrance of a transient or impulse and then in a negascribed as that specie which employs feedback energy, not during the state of forced oscillations, but only during the entrance of a transient or impulse and then in a negative sense for generating a local transient or impulse for neutralizing the entering transient or impulse.

While only certain specific embodiments of the two species of the invention have been illustrated and described to convey the general concept of the invention, it is to be understood that the same is readily capable of various other embodiments within its spirit and scope as defined in the appended claims. It is further to be understood that although intended primarily for use in radio-wave and under-water-sound (sonar) receivers, the present invention is equally applicable to other receiving systems, as for example, some of the various carrier systems now used for communications, telemetering and supervisory control.

I claim as my invention:

1. An impulse-noise arresting alternating-current tuned amplifier of the character disclosed comprising, in combination, a signal source, amplifying means, and a coupled resonant circuit including a capacitor and a transformer having a primary section connected to said signal source, a secondary section connected across said capacitor and the input terminals of said amplifying means, said secondary section and capacitor comprising an oscillatory circuit tuned to the frequency of a signal current in said primary section, and a tertiary section comprising a feedback loop operable for generating positive feedback energy during the state of forced oscillations in said coupled resonant circuit and operable for generating feedback energy during the entrance into said coupled resonant circuit of an externally-generated electrical transient or impulse which is negative with respect thereto, said negative feedback energy constituting a locally-generated electrical transient or impulse, whereby said externally-generated and locally-generated electrical transients or impulses are neutralized by effecting their coincidence in time and place in said coupled resonant circuit.

2. An impulse-noise arresting alternating-current tuned amplifier of the character disclosed comprising, in combination, a signal source, an amplifying means, a summing amplifier having two inputs, a coupled resonant circuit including a capacitor and a transformer having a primary section connected to said signal source, a secondary section connected across said capacitor and the input terminals of said amplifying means, and a tertiary section connected to one of the two inputs of said summing amplifier, the other of said inputs being connected to the output of said amplifying means, said secondary section and capacitor comprising an oscillatory circuit tuned to the frequency of a signal current in said primary section, said inputs having voltages thereon which effect zero output of said summing amplifier during the state of forced oscillations in said coupled resonant circuit, said inputs having voltages thereon which effect an amplified-sum output of said summing amplifier in response to an externally-generated electrical transient or impulse entering said coupled resonant circuit thereby to generate a local electrical transient or impulse having substantially equal and opposite characteristics to those of said entering electrical transient or impulse, and means operatively coupling the output of the summing amplifier to said coupled resonant circuit for neutralizing said externally-generated and locally-generated electrical transients or impulses by effecting their coincidence in time and place in said coupled resonant circuit.

3. An impulse-noise arresting alternating-current tuned amplifier of the character disclosed comprising, in combination, a signal source, an amplifying means, a summing amplifier having two inputs, a coupled resonant circuit including a capacitor and a transformer having a primary section connected across said signal source, a secondary section connected across said capacitor and the input terminals of said amplifying means, and a tertiary section connected to one of the two inputs of said summing amplifier, said secondary section having a tap connected to the other of said inputs, said secondary section and capacitor comprising an oscillatory circuit tuned to the frequency of a signal current in said primary section, said inputs having voltages thereon which effect zero output of said summing amplifier during the state of forced oscillations in said coupled resonant circuit, said inputs having voltages thereon which effect an amplified-sum output of said summing amplifier in response to an externally-generated electrical transient or impulse entering said coupled resonant circuit thereby to generate a local electrical transient or impulse having substantially equal and opposite characteristics to those of said entering electrical transient or impulse, and means operatively coupling the output of the summing amplifier to said coupled resonant circuit for neutralizing said externally-generated and locally-generated electrical transients or impulses by effecting their coincidence in time and place in said coupled resonant circuit.

4. A circuit arrangement for suppressing a noise-producing electrical impulse comprising, in combination: a transformer having juxtapositioned primary, secondary and tertiary windings and useful parasitic capacitances therebetween, means connected to the secondary winding for amplifying a radio-frequency signal and an accompanying noise-producing electrical impulse applied to the primary winding to derive both an amplified signal and a locally-generated impulse, and a feedback loop comprising said tertiary winding and said amplifying means for deriving positive feedback for the amplified signal and negative feedback for the locally-generated impulse to effect substantial neutralization of both said impulses in said parasitic capacitances.

5. A circuit arrangement for suppressing a noise producing electrical impulse comprising, in combination: means for receiving a radio-frequency signal and an accompanying noise-producing electrical impulse comprising a transformer having pie-wound primary, secondary and tertiary coils juxtapositioned on a common axis with said secondary coil occupying the central position, each of said coils having multilayer wire-turns and physical dimensions to provide useful parasitic capacitance between said secondary coil and each of said adjacent coils, means connected to said secondary coil for amplifying said signal and said impulse when applied to said primary coil to derive an amplified signal and a locally-generated impulse, and means for feeding the amplified signal and locally-generated impulse back to said tertiary coil for regenerative amplification of the signal and substantial neutralization of said accompanying and locally-generated impulses in said parasitic capacitances.

6. A circuit arrangement for receiving an electrical signal and an accompanying electrical impulse comprising, in combination: a radio-frequency transformer having a primary winding, a secondary winding, and a tertiary winding, said windings comprising pie-wound coils assembled side-by-side on a common axis with said secondary winding occupying the central position, each of said coils having sufficient number of layers of wire-turns and physical dimensions to establish a useful parasitic capacitance between said secondary winding and said primary winding on one side and said tertiary winding on the other side, means to apply said signal and said accompanying impulse to said primary winding, a resonant circuit comprising said secondary winding tuned to the frequency of said signal, an amplifier having its input terminals connected to said resonant circuit to amplify said signal and said impulse, said amplifier having its output terminals connected to said tertiary winding to derive positive feedback of the amplified signal and substantial neutralization of said impulses in said parasitic capacitances.

7. An impulse-noise arresting tuned amplifier of the character disclosed comprising, in combination: a signal source, amplifying means, and a coupled resonant circuit including a capacitor and a transformer having a primary winding, a secondary winding, and a tertiary winding, said windings juxtapositioned on a common axis with said secondary winding located between said primary winding on one side and said tertiary winding on the other side, each of said windings comprising a pie-wound coil having adequate physical dimensions for providing useful parasitic capacitances between said secondary winding and said adjacent windings, said primary winding connected to said source, said secondary winding connected across said capacitor and the input terminals of said amplifying means, said secondary winding and capacitor comprising an oscillatory circuit tuned to the frequency of the signal current in said primary winding, said tertiary winding connected to the output terminals of said amplifying means to provide a feedback loop for regenerative amplification of the signal and substantial neutralization of an externally-generated electrical impulse in said parasitic capacitances.

References Cited by the Examiner

UNITED STATES PATENTS

| | | | |
|---|---|---|---|
| 1,696,860 | 12/28 | Pearne | 330—197 |
| 1,784,506 | 12/30 | Arco. | |
| 1,981,056 | 11/34 | Lohrmann. | |
| 2,503,780 | 4/50 | Van Der Ziel. | |

ROY LAKE, *Primary Examiner.*

BENNETT G. MILLER, *Examiner.*